(12) United States Patent
Bodnar et al.

(10) Patent No.: US 12,228,447 B2
(45) Date of Patent: Feb. 18, 2025

(54) SYSTEM AND METHOD FOR SENSING HIGH-FREQUENCY VIBRATIONS

(71) Applicant: Velvetwire LLC, Santa Cruz, CA (US)

(72) Inventors: Eric Oleg Bodnar, San Francisco, CA (US); Jacob Van Reenen Pretorius, Austin, TX (US)

(73) Assignee: Velvetwire, LLC, Santa Cruz, CA (US)

( * ) Notice: Subject to any disclaimer, the term of this patent is extended or adjusted under 35 U.S.C. 154(b) by 0 days.

(21) Appl. No.: 18/349,932

(22) Filed: Jul. 10, 2023

(65) Prior Publication Data

US 2024/0011826 A1 Jan. 11, 2024

Related U.S. Application Data

(63) Continuation of application No. 16/735,659, filed on Jan. 6, 2020, now Pat. No. 11,698,293, which is a continuation of application No. 15/608,965, filed on May 30, 2017, now Pat. No. 10,527,487.

(60) Provisional application No. 62/343,832, filed on May 31, 2016.

(51) Int. Cl.
*G01H 11/08* (2006.01)
*H04N 5/04* (2006.01)
*H04N 23/57* (2023.01)

(52) U.S. Cl.
CPC .............. *G01H 11/08* (2013.01); *H04N 5/04* (2013.01); *H04N 23/57* (2023.01)

(58) Field of Classification Search
CPC .......... G01H 11/08; H04N 5/04; H04N 23/57
See application file for complete search history.

(56) References Cited

U.S. PATENT DOCUMENTS

| 4,429,580 A | 2/1984 | Testa et al. |
| 4,849,668 A | 7/1989 | Crawley et al. |
| 5,099,702 A * | 3/1992 | French ................ A61B 5/1036 600/595 |

(Continued)

FOREIGN PATENT DOCUMENTS

| AU | 06974/94 B2 | 10/1998 |
| CN | 102822960 B | 6/2015 |

(Continued)

OTHER PUBLICATIONS

European Search Results for Application 17807445.4, Dated Apr. 7, 2020 (3 pages).

(Continued)

*Primary Examiner* — Tarun Sinha
(74) *Attorney, Agent, or Firm* — Nicholson De Vos Webster & Elliott LLP; Judith Szepesi

(57) ABSTRACT

A system for reporting one or more events of interest in a structure, including an apparatus configured to be securely adhered to a surface of the structure, the apparatus having a flexible portion which conforms to a shape of the surface of the structure. The flexible portion containing a sensor to measure mechanical strain in the surface of the structure, and conductive traces to connect the sensor to electronics. The electronics to capture and buffer a signal output by the sensor, and a computational element to analyze the captured signal into a polynomial representing an event of interest. The system further including a wireless communication element to transmit the event of interest.

20 Claims, 4 Drawing Sheets

(56) References Cited

U.S. PATENT DOCUMENTS

| | | |
|---|---|---|
| 5,296,651 A | 3/1994 | Gurrie et al. |
| 5,723,792 A | 3/1998 | Miyazaki |
| 5,792,058 A | 8/1998 | Lee et al. |
| 5,988,646 A | 11/1999 | Fair |
| 6,109,115 A | 8/2000 | Miyazaki |
| 6,191,519 B1 | 2/2001 | Nye et al. |
| 6,192,759 B1 | 2/2001 | Schoess |
| 6,196,932 B1 | 3/2001 | Marsh et al. |
| 6,252,334 B1 | 6/2001 | Nye et al. |
| 6,370,964 B1 | 4/2002 | Chang et al. |
| 6,404,107 B1 | 6/2002 | Lazarus et al. |
| 6,529,127 B2 | 3/2003 | Townsend et al. |
| 6,625,569 B2 | 9/2003 | James et al. |
| 6,694,548 B2 | 2/2004 | Foster et al. |
| 6,781,285 B1 | 8/2004 | Lazarus et al. |
| 6,802,216 B2 | 10/2004 | Van et al. |
| 7,193,720 B2 | 3/2007 | Gatt |
| 8,994,528 B2 | 3/2015 | Celik-Butler et al. |
| 9,798,902 B2 | 10/2017 | Ludlow et al. |
| 2005/0121796 A1 | 6/2005 | Park et al. |
| 2006/0083411 A1 | 4/2006 | Benkley |
| 2006/0220657 A1 | 10/2006 | Mitchell et al. |
| 2007/0105664 A1* | 5/2007 | Scheinert ............... A63B 49/00 473/461 |
| 2008/0191174 A1 | 8/2008 | Ehrensvard et al. |
| 2009/0190319 A1 | 7/2009 | Hatakeyama |
| 2009/0195517 A1 | 8/2009 | Duheille et al. |
| 2009/0233729 A1 | 9/2009 | Chiang et al. |
| 2011/0304497 A1 | 12/2011 | Molyneux et al. |
| 2012/0029843 A1 | 2/2012 | Byreddy et al. |
| 2012/0170231 A1 | 7/2012 | Lee |
| 2013/0010405 A1 | 1/2013 | Rothkopf et al. |
| 2013/0016049 A1 | 1/2013 | Eom et al. |
| 2013/0133822 A1 | 5/2013 | Koetse et al. |
| 2013/0338982 A1* | 12/2013 | Schwab ............... G01M 15/12 703/7 |
| 2014/0055974 A1 | 2/2014 | Hansen |
| 2014/0083206 A1 | 3/2014 | Pagani et al. |
| 2014/0276504 A1 | 9/2014 | Heil et al. |
| 2014/0305204 A1 | 10/2014 | Hong et al. |
| 2014/0309059 A1 | 10/2014 | Minch |
| 2015/0029341 A1* | 1/2015 | Sinha ............... H04N 21/42202 348/157 |
| 2015/0051009 A1 | 2/2015 | Davenport |
| 2015/0054632 A1 | 2/2015 | Ben Ezra |
| 2015/0057112 A1 | 2/2015 | Sak et al. |
| 2015/0192482 A1 | 7/2015 | Araki et al. |
| 2015/0271415 A1 | 9/2015 | Uemura et al. |
| 2015/0296622 A1 | 10/2015 | Jiang et al. |
| 2016/0073961 A1 | 3/2016 | Soh et al. |
| 2016/0149292 A1 | 5/2016 | Ganton et al. |
| 2016/0352031 A1 | 12/2016 | Ito |
| 2017/0223846 A1 | 8/2017 | Elolampi et al. |
| 2017/0231098 A1 | 8/2017 | Zluc et al. |
| 2017/0237430 A1 | 8/2017 | Stone |
| 2017/0250687 A1 | 8/2017 | Stone |
| 2018/0146551 A1 | 5/2018 | Kida |
| 2018/0314368 A1 | 11/2018 | Isaacson et al. |
| 2018/0321061 A1 | 11/2018 | Rissing et al. |
| 2019/0059164 A1 | 2/2019 | Hassemer et al. |
| 2019/0082536 A1 | 3/2019 | Park et al. |
| 2019/0104616 A1 | 4/2019 | Marsh |
| 2020/0217711 A1 | 7/2020 | Pretorius et al. |
| 2021/0020824 A1 | 1/2021 | Bodnar et al. |
| 2021/0041273 A1 | 2/2021 | Nishi |

FOREIGN PATENT DOCUMENTS

| | | | |
|---|---|---|---|
| CN | 102881710 B | 8/2017 | |
| EP | 1944095 A2 | 7/2008 | |
| GB | 2261290 A | 5/1993 | |
| GB | 2531339 A | 4/2016 | |
| WO | 2006/094513 A2 | 9/2006 | |
| WO | 2009/094728 A1 | 8/2009 | |
| WO | WO-2011110806 A1 * | 9/2011 | ............ A63B 59/55 |
| WO | 2016/054372 A1 | 4/2016 | |
| WO | 2019/155732 A1 | 8/2019 | |

OTHER PUBLICATIONS

Final Office Action, U.S. Appl. No. 16/735,659, May 3, 2022, 21 pages.

Non-Final Office Action, U.S. Appl. No. 16/735,659, Nov. 19, 2021, 14 pages.

Notice of Allowance, U.S. Appl. No. 16/735,659, Dec. 13, 2022, 9 pages.

Notice of Allowance, U.S. Appl. No. 16/735,659, Jul. 21, 2022, 9 pages.

Notice of Allowance, U.S. Appl. No. 16/735,659, May 22, 2023, 9 pages.

PCT Written Opinion for PCT/US2017/035317, Sep. 8, 2017 (7 pages).

* cited by examiner

SYSTEM AND METHOD FOR SENSING HIGH-FREQUENCY VIBRATIONS

RELATED APPLICATIONS

The present application is a continuation of U.S. application Ser. No. 16/735,659, filed on Jan. 6, 2020, issuing as U.S. Pat. No. 11,698,293 on Jul. 11, 2023, which application is a continuation of U.S. application Ser. No. 15/608,965, filed on May 30, 2017, issued as U.S. Pat. No. 10,527,487, on Jan. 7, 2020, which claims priority to U.S. Provisional Patent Application No. 62/343,832 filed on May 31, 2016, all of which are incorporated by reference in their entirety.

FIELD

The present application relates to manufacturing and utilizing high-frequency vibration sensors applied to equipment, electronics to interpret vibrations, software and methods to identify information regarding vibration and methods to communicate vibration related information to devices physically removed from the equipment.

BACKGROUND

Detecting vibrations in sporting equipment is desired as it can provide a wealth of information regarding the state of play. For instance, in tennis and volleyball, rulings are made based on if the net was touched or not; in cricket and baseball, batsmen can be ruled out if they touched the ball with their bats etc.

Furthermore, as sports coaching becomes more technologically advanced, the ability to locate the impact of a ball on a bat is desirable in order to instruct students how to improve their game.

Televised sports generate substantial revenues for broadcasting companies. These companies employ the services of multiple technology providers in order to provide more detailed information reading the state of play and the players as to increase the appeal and excitement of their broadcast.

Multiple attempts in the prior art have been made to introduce vibration sensors onto sports equipment. To date none of the approaches described in the prior art have been implemented on the sports field. The reasons for this include high cost, impact robustness concerns, operational lifetime, intrusiveness to equipment and player, performance as well as inability to sense vibrations to the level of detail that enables the reduction of performance parameters.

Therefore, a technology would be desirable that is non-intrusive the equipment and player, has a long operational life, is robust to impact, is affordable, can sense vibration levels of concern and is able to communicate relevant information fast and accurately to remote receivers.

BRIEF DESCRIPTION OF THE DRAWINGS

The description below refers to the accompanying drawings, of which.

DETAILED DESCRIPTION

Figure 1:
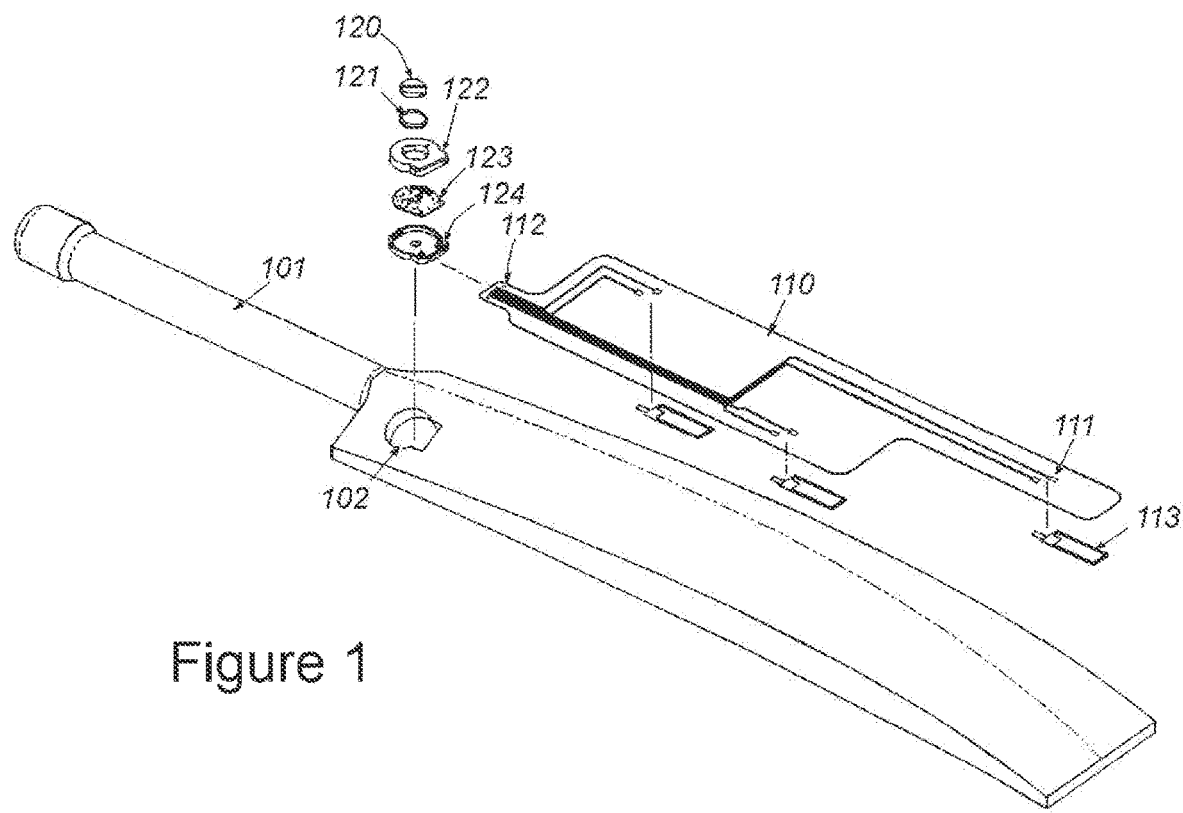
FIG. 1 is a depiction of an exemplary layout of the sensing system on a cricket bat.

The method and apparatus described here overcomes deficiencies in the prior art by integrating highly-sensitive, high-frequency, soft-polymer vibrations sensors with the equipment. Furthermore, low-power electronics with the ability to capture and analyze specific signals of concern is utilized as to increase the operational lifetime of the system and decrease the number of recharge or battery changes per match. In one embodiment, high-frequency vibration data is captured and stored locally on the equipment where user-defined code can analyze data and pick specific parameters of concern to send via the wireless communications link to a receiver. The receiver is able to capture the data and re-construct events of interest. This architecture will reduce the power and bandwidth requirements of the device while maintaining functionality and the ability to transmit and report parameters and incidents of interest.

In an illustrative embodiment a system for measuring and reporting vibrations in sporting equipment comprises a sensor arrangement that is integrated into the decorative sticker of the equipment. Illustratively, the sticker includes piezo electric materials, which can be piezoelectric polymers. The sampling rate of the sensor arrangement can be up to and higher than 2 kHz and contact can be made with the material via conductive traces in the sticker. The conductive traces can be printed as part of the sticker, and can be copper on polyamide. Illustratively, a method for measuring vibrations in sporting equipment that utilizes the sensor arrangement can include the steps of integrating the sensor arrangement into the decorative coating of the equipment, and moving the sporting equipment to generate sensor data that is transmitted to an analyzing device.

In an embodiment, the sensor arrangement is interconnected to an electronic component, and the interconnection can be by conductive ink printed within the decorative coating. The electronic component can be co-encapsulated with the sensor arrangement in the decorative coating. Illustratively, the electronic component can include a wireless transmitting capability, and data is transmitted exclusively in response to an event. The event can be determined by a preset threshold. The signal of the sensor arrangement can be monitored in a low-power mode until the event occurs, and high-frequency data can be acquired for a predetermined period in response to the event occurring. The high frequency data can be analyzed by the electronic component and specific information regarding the data can be determined. The specific information can be transmitted exclusively via the wireless network. Illustratively, the sensor arrangement and the electronic component are constructed and arranged to utilize minimum amounts of battery power for sensing, recording and transmitting data. In an embodiment, an analyzing arrangement allows reconstruction of the data traces at a receiving end.

In an illustrative embodiment, a method of sensing vibrations in sports equipment that is integrated into the decorative coatings of the equipment comprises the steps of capturing vibration signals within a sensor and circuitry integrated in the coatings, and transmitting the vibration signals as data via wireless data transfer in order to synchronize the vibration data with optical sensor data. The optical sensors can be ultra-motion cameras and/or can be integrated into a handheld device or devices. The handheld device can be a mobile phone with an integrated camera.

In an illustrative embodiment, a system and method for measuring and reporting vibrations in sporting equipment includes a sensor arrangement that is integrated into the decorative sticker of the equipment. Illustratively, the sticker includes piezoelectric materials, such as piezoelectric polymers (e.g. polyimide). The sampling rate of the sensor arrangement can be up to, and higher than, approximately 2 kHz. Electrical contact can be made with the material via conductive traces in the sticker. The conductive traces are printed as part of the sticker, using, (e.g.) screen-printed conductive ink. Alternatively, the conductive traces can be copper on a polymer on polyamide. A method for measuring vibrations in sporting equipment that utilizes the above-described sensor arrangement can include integrating the sensor arrangement into the decorative coating of the equipment and applying acceleration/deceleration to the sporting equipment to generate sensor data that is transmitted to an analyzing device. Illustratively, the sensor arrangement is interconnected to an electronic component and/or the sensor arrangement and electronic component are interconnected by (e.g. conductive ink printed) traces within the decorative coating. The electronic component can be co-encapsulated with the sensor arrangement in the decorative coating and can include a wireless transmitting capability. In exemplary embodiments data is transmitted exclusively in response to an event, and/or the event is determined by a pre-set threshold. A signal of the sensor arrangement can be monitored in a low-power mode until the event occurs. Illustratively, high frequency data is acquired for a predetermined period in response to the event occurring. The high frequency data can be analyzed by the electronic component and specific information regarding the data is determined. The specific information can be transmitted exclusively via the wireless network. Illustratively, the sensor arrangement and the electronic component are constructed and arranged to utilize minimum amounts of battery power for sensing, recording and transmitting data. In exemplary embodiments, an analyzing arrangement allows reconstruction of the data traces at a receiving end.

In another illustrative embodiment, a method of sensing vibrations in sports equipment, which is integrated into the decorative coatings of the equipment, is provided. The method includes capturing vibration signals within a sensor and circuitry integrated in the coatings, and transmitting the vibration signals as data via wireless data transfer in order to utilize and/or store data on a separate device. Illustratively, the transmitted vibration data is synchronized with optical sensor data. The optical sensors are ultra-motion cameras. In an exemplary embodiment, the optical sensors are integrated into handheld device or device, which can be a mobile phone or plurality of phones, each with an integrated camera.

Sensing the vibrations generated in equipment has been suggested previously in prior art. The utility of being able to detect if there was contact between the equipment and the ball, the location of the impact as well as the intensity of the impact is well known to those skilled in the art. However, the art is salient on methods that can perform this task in a manner such that the market will accept it and hence there are currently no products available to sense the vibrations on sports equipment.

To date, methods to detect vibrations in sport equipment have suffered from the following deficiencies:

Low-frequency sensing. For instance, MEMS accelerometers are only capable of sensing frequencies up to ~2 kHz where a number of impacts create signals at much higher frequencies.

Direct impact with the ball. A number of prior art descriptions include placing sensors on the contact surface of the equipment. This increases the probability of damaging the sensors and also impair wear and tear.

Intrusive: Many sensing devices available in the market are bulky and sold as "add-ons" to equipment, thereby impacting the performance, weight and usefulness of the equipment.

Low battery life: Interrogating sensors and transmitting data continuously places severe strain on battery life and thus reduced useful operational life.

Delay in receiving/exporting data: Some devices log data that has to be downloaded for review by physically connecting to display devices. These devices cannot supply information in real time, nor can they provide direct feedback on action as it happens.

The method and apparatus disclosed here will overcome these deficiencies by combining a number of existing and available technologies in order to solve the overall systems problem so that the application will find uptake in the market.

FIG. 1 illustrates one possible embodiment of the apparatus integrated into a cricket bat. It is well understood by those skilled in the art the this illustration and sport equipment is for general description of the method and apparatus and that different formats of the apparatus are possible and that it is also possible to integrate the solution on different types of bats, rackets, clubs and other equipment.

Ubiquitous to cricket bats and sports gear in general is logo and artwork that is applied to the equipment as one of the final steps in manufacturing. This artwork performs the function of identifying the manufacturer, make and model of the bat as well as provide aesthetics to incentivize the purchase of the equipment. To date this artwork comes in the form of a sticker that has a transparent polymer layer on which the artwork is printed. A double sided adhesive is applied to the printed side to complete the sticker. This sticker is supplied to the bat/equipment manufacturer who peels off the protective paper on the other side of the double sided adhesive and applies the sticker to the bat. The adhesive is designed to adhere to the bat/equipment for the life of the equipment. The sticker is usually applied to a part of the bat/equipment that does not come into contact with other pieces of equipment such as balls, further enhancing the lifetime of the artwork. This process allows artist to create all forms, shapes and artwork of stickers that are applied to the bats and equipment. To date these stickers have only performed a visual esthetic and identification function and not a measurement function.

In FIG. 1, bat 101 is removed from all artwork. Multi-functional sticker 110 consists of not only artwork, but also of conductive traces 111 that electrically connect to electrodes on vibration sensors 113. Vibration sensors 113 can be piezo electric ceramics such as PZT-5 (A,H), PZT-4, piezo electric polymers such as PVDF, piezo resistive materials such as silicone, or any other sensing material capable of sensing vibration in frequencies higher than 2 kHz as known to those skilled in the art. These conductive traces can be screen printed conductive ink, copper etched traces on material such as polyamide or FR4 or other flexible materials as known to those skilled in the art. Conductive traces 111 can take on any form to allow flexibility in the design of the artwork as well as the layout and cut of the sticker as known to those skilled in the art. This provides artists the opportunity to design and produce logos and artwork that have the desired form but maintain the conductive function. Conductive tracks 111 allows multi-functional sticker 110 to conduct electric signals generated by sensor 113 in response to vibrations to sensing electronics 123.

Figure 2:
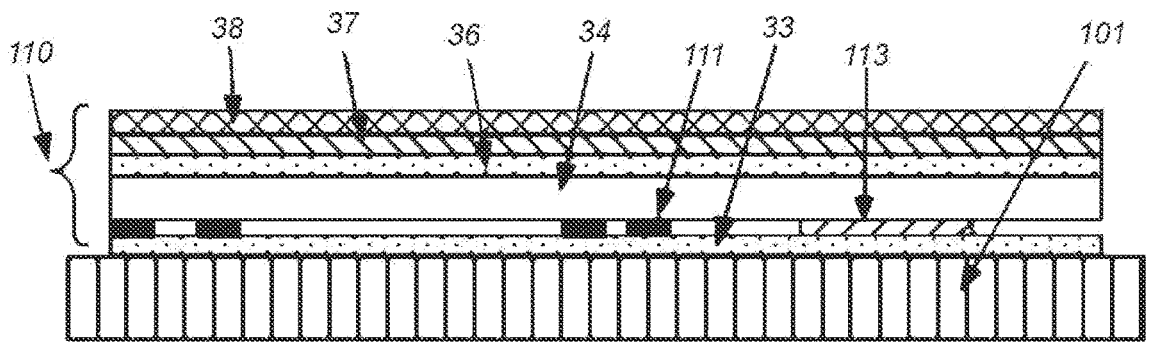
FIG. 2 indicates the layers that make up the integrated sensing and artwork system.

FIG. 2 is a cutaway view of sports equipment and multi-functional sticker 110, in the case of the bat in FIG. 1, looking in the direction of the handle. The layers amalgamating to form multi-functional sticker 110 of the equipment is shown. Equipment in the specific illustration is the wood of bat 101. It should be obvious to those skilled in the art that the equipment can be of a plurality of materials such as fiber glass, aluminum, titanium, fiber-reinforced plastics, wood, polymer, metal-ceramic composites, ceramics or any other material utilized in the equipment of different sports. Thin, double-sided, adhesive layer 33 bonds multi-functional sticker 110 to bat 101. Adhesive layer 33 needs to be thin and stiff in order to transmit high frequency mechanical vibrations efficiently to sensor 113. The other side of double sided adhesive 33 is in contact with sticker di-electric layer 34, conductive tracks 111 and sensor 113. Di-electric layer can be of any electrically insulating material such as polyester, polyamide, fiber re-enforced plastics etc. Adhesive 33, conductive tracks 111, sensor 113 and di-electric 34 make up the sensing layer of multi-functional sicker 1110. Adhesive gasket 36, multi-layer artwork 37 and sticker base 38 make up the logo/artwork layer. This layer is produced just as current logo/artwork stickers today with a double sided adhesive 36 enclosing multi-layer 37 artwork on one side and sticker base 38 on the other. The manufacturing of logo/artwork layer is well known to those skilled in the art. Printing conductive tracks 111 on di-electric layer 34 is also well known to those skilled in the art. We teach here the integration of vibration sensor 113 with conductive traces 111 with logo/artwork and the attachment of sensors to sporting equipment in such a manner that mechanical vibrations are efficiently transmitted to vibration sensors, the signal of the vibration sensors are captured and transmitted to electronics, sensors 113 and traces 111 that are sufficiently isolated from the environment and that logo's and artwork can be placed onto the sensing layer without inhibiting the designer of such logo/artwork. Furthermore, the simplicity and non-intrusiveness of adding the sensing layer will not interfere with the weight or balance of the bat in such a way that it will make a difference to the player or operator of the equipment.

In the exemplary embodiment of FIG. 1, sensing electronics 123 is housed in bottom cover 124 that contains male pins that slide into mounting holes 112 cut into sticker 110. These mounting holes line up traces 110 with electric connecting pads on electronics 123 so that electrical contact can be made between electronics 123 and sensors 113. This mounting technique allows for mechanical strain relief from the electric contact point between the conductive traces and the electronics. In certain embodiments it might be desired to mount electronics 123 flash with the bat or equipment faces and mounting hole 102 can be machined or otherwise mechanically created. Bottom cover 124 fits into mounting hole 102 and can be mechanically secured by means of adhesives, press fit, screws or any other mechanical fastening method known to those skilled in the art.

Electronics 123 is electrically connected to conductive traces 111 via connectors, conductive adhesives, crimp fits or any other method that electrically and mechanically join two conductive surfaces known to those skilled in the art. Electronics 123 are affixed to bottom cover 124 by crews, press fit, adhesives or any other method known to those skilled in the art. The mechanical fixing can happen before or after electronics 123 are electrically connected to conductive traces 111 as will be appreciated by those skilled in the art. By the end of the process, electronics 123 is both electrically connected to conductive traces 111 and affixed to bat 101.

As an example, electronics 123 are protected by top cover 122 that also house battery 121 and battery cover 120. In this specific example easy aces to battery 121 is provided by battery cover 120 so that battery 121 can be replaced very quickly when needed. As will be appreciated by anyone skilled in the art, the example of protection for electronics 123 and the methods of integrating the battery are one of many possible ways to perform the task of protecting electronics 123 and supplying power to electronics 123. For example, electronics can be integrated into sticker 110 by means of flex-circuitry a method well-known to those skilled in the art. Flex circuitry protects electronics 123 completely from all sides by mean of a polymer an adhesive process well known to those skilled in the art. Other protection mechanisms include potting the electronics, integrating thermoset materials, and other mechanisms known to those skilled in the art Electric power to electronics 123 can also be provided in multiple ways as those skilled in the art will appreciate. For instance, battery 121 can replaceable or be re-chargeable by means of a cord such as a USB or micro-USB or any other ubiquitous power cord device. Wireless and contactless power transfer methods known to those skilled in the art can also be utilized to re-charge battery 121. The battery can also be completely removed/remote from the electronics, and placed in the handle for example. Depending on the technology of sensor 113, the electric energy of the sensor can be used to recharge battery 121. Capturing and utilizing power generated by piezoelectric devices in response to vibration is well known to those skilled in the art. Sticker 110 can also incorporate a solar cell to capture energy from light as is well known to those skilled in the art. A-Si thin film solar cells are particularly well suited to recharge energy storage devices when incorporated into flexible materials. Battery 121 can also be a super capacitor or any other material capable of storing electric energy as will be apparent to those skilled in the art.

Figure 3:
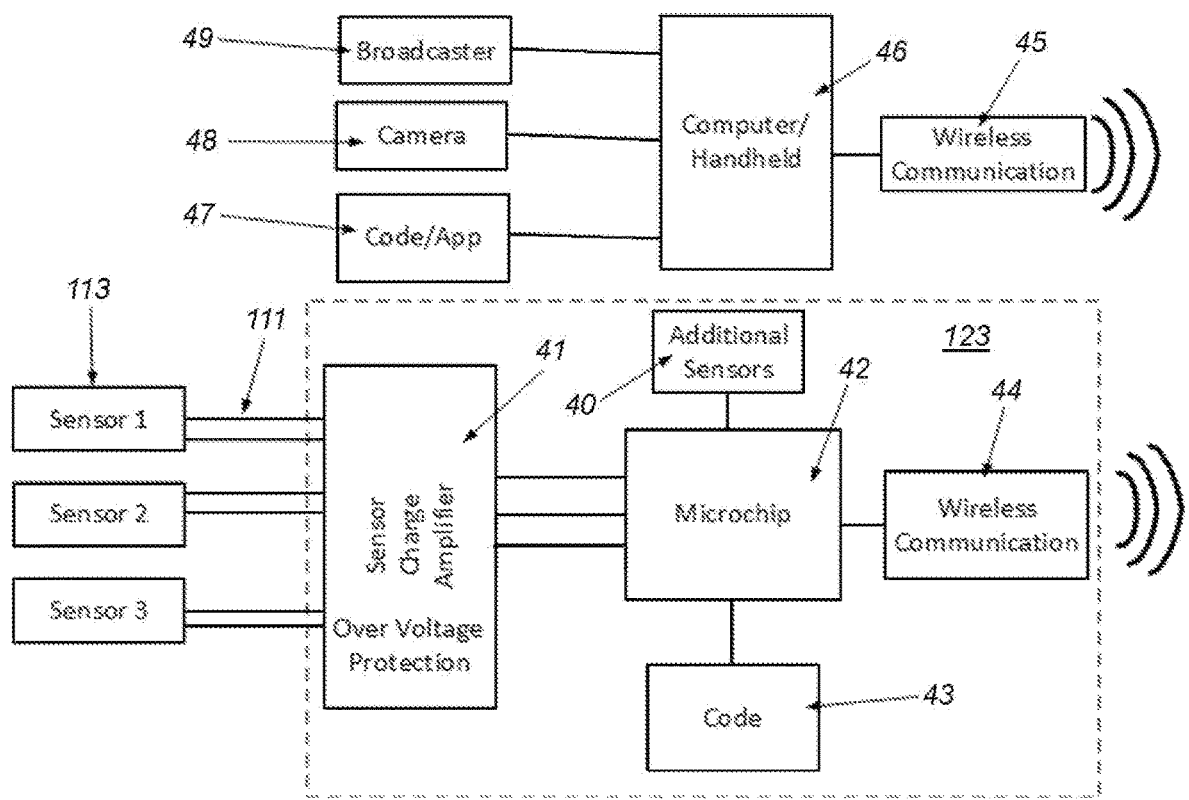
FIG. 3 is an example of a sensing system architecture for detecting edges on cricket bats.

To illustrate the working of the sensing system, the specific example of utilizing piezoelectric polymer sensors in combination with printed conductive traces in a cricket bat will be used. As described above these are but one of many combinations and methods that can be utilized to achieve the same objective: Capturing high frequency vibration data within sporting equipment. In FIG. 1, sensors 113 generate electric charge in response to mechanical strain. Therefore, when an object comes into contact with bat 101, the mechanical vibrations generated by this event will manifest itself as a charge over the poles of sensors 113. Following in FIG. 1 and FIG. 3, this charge is discharged in the form of current and voltage over the poles of the sensor and can be conducted via conductive traces 111 to electronics 123. Electronics 123 can consist of a low noise charge amplifier 41 that converts the generated electric charge of sensor 113 into a voltage trace free of ambient noise as will be known to those skilled in the art. Charge amplifier 41 can be integrated with electronics 123 or can be located closer to sensor 113 in order to reduce the influence of external noise. When piezo sensors are utilized, overvoltage protection to protect electronics 123, known to those skilled in the art will also be utilized. The amplified voltage trace from each sensor is then fed through an analog to digital converter to produce and digital representation of the voltage trace generated by the sensors, a ubiquitous process known to those skilled in the art. This digital signal is then fed to a microprocessor that has the ability to perform a range of signal processing steps on the trace to identify events of concern. A modern microchip 42 combines Analog to Digital convertor (A/D) and computational power as well as sufficient internal memory. It might be desirable to utilize external A/D's for higher frequency sampling. Additional sensors 40 such as accelerometers, gyro meters, magnetometers, microphones, cameras or any other instrument that can provide additional information can optionally be connected to microchip 42 as will be grasped by those skilled in the art. Software/Firmware code 43 will instruct microchip 42 on how to access, store, record, manipulate and transmit data collected by the sensor array. Microchip 42 can be equipped with wireless signal communications device 44 that can communicate information wirelessly from electronics 123 to a third party receiver 46 located within range of the transmitting electronics. Wireless communication receivers and transceivers 44 and 45 can be of a multitude of industry standards known to those skilled in the art, such as Bluetooth®, WiFi, Ultra-Wide Band WiFi, Zigby, laser etc. Signal communications device 44 can also be a separate piece of hardware. Third party device 46 such as a computer or a handheld device is equipped or connected to a wireless communications module 45 to receive signals from and transmit to electronics 123 as well as software or applications that can interpret and display the information transmitted from electronics 123. Third party device 46 can also be equipped with an internal camera or connected to an external camera or series of cameras to enable the combination of visual data with the vibration information supplied by electronics 123. Specifically, the camera of a handheld device that is capable of taking high-speed images such as the slow-motion (Slo-mo) function of an iPhone camera can be used. For sporting events, third party device 46 can also be connected to the broadcaster of the event in order to deliver content to the broadcaster or receive content in the form of audio, visual and other information from the broadcaster. A specific objective of this method and apparatus is to combine the images from ultra-motion cameras set up around a sports stadium and calibrating the output from electronics 123 with the feed of these cameras for entertainment and officiating purposes. This entire process should be well known to those skilled in the art.

By way of non-limiting example, the following exemplary parameters and/or specifications are applicable to the system according to an illustrative embodiment:

1. Comparator: Between approximately 500 nanoAmps and 1 micro amp always on
2. Microprocessor: In deep sleep, between approximately 5 and 10 micro Amps—always
3. Microprocessor: In operation, i.e. sampling data approximately 1.5 to 5.5 milliAmps. Duration of operation: 0.1 to 4 milliseconds.
4. Accelerometer: 100 micro amps in slow/wait mode and approximately 500 in data acquisition mode (0.1 to 4 milliseconds)
5. RF connection approximately 940 micro/1 milliAmp amps during data transmission whereby the device consumes approximate max 1+10+100=111 microAmp hours during sleep and the micro 111+5,500=~6 milliAmps during operation of 4 milliseconds approximate maximum. So that is 24e-6/3600=7 nanoAmps hours per use The RF connection is approximately 1 milliAmp and can run approximately ⅓rd of a second for 640 8-bit samples. This consumes approximately 330 microAmp seconds or 0.1 microAmp hours per event. Sending 12 samples instead of 640 will consume approximately 17 nanoAmp hours per use Therefore, a standard coin cell mounted within the device of ~150 mAh will:

1. Last ~1,300 hours without operating
2. Can collect data and send it out at a high rate ~1,400 times
3. Can collect data and send it out at a low rate for ~6 million times Hence, where a player, on average, bats 3 hours per week and makes contact with 200 balls, and has twice as many other events, this arrangement provides and estimated 600 events plus 3 hour operation per week. Therefore, power consumption is approximately 111 microAmp hours×3+600*(0.107 microAmp hours)=175 microAmp hours per week or 380 weeks of playing in a high-power mode. Alternatively, in low-power mode the device can operate approximately 430 weeks. In most bat sports (e.g. cricket) this time outlasts the useful life of the actual bat.

It is also desirable to provide the system with a power source that is optimized for low weight, small footprint and long life. As discussed above, batteries and ultra-capacitors of all forms and sizes with different charging and replacement techniques can be utilized to optimize performance. However, consuming less power while delivering the content rich vibration information to third party devices is a challenge and one that is specifically addressed by this method and apparatus. By way of further example, the arrangement described herein can include rechargeable batteries as a power source. The battery technology used herein can be highly variable—for example NiMH, Li-Poly, NiCd, hydrogen fuel cells, etc. Recharging technologies can include solar and light-based, high-output photovoltaics, inductive charging, direct conductor connections, etc.

To date, prior art dose not provide an adequate solution for communications between vibration sensors and third-party devices. For instance, prior art refers to WiFi or Bluetooth® communication without providing any details of the process. Also, prior art is not specific with regard to the sampling frequency and the type of information that needs to be delivered from the vibration sensor to the third party device. The problem with previous approaches are as follow:

Continuous wireless communication between two devices requires significant amounts of power and will therefore limit system operational lifetime or require a power source of a size that will interfere with the use of the equipment. The power consumed by electronics 123 scales with frequency and data bit rate.

Low-frequency sampling (<2 KHz) does not provide the signal fidelity to identify events accurately.

Continuous high-frequency (>2 kHz) sampling and transmitting requires significant amounts of power. The power usage scaling with both frequency and data bit-rate.

To overcome these deficiencies our system can operate on the following principles:

Low-frequency, low power, continuous sampling of sensors to identify the occurrence of an event.

Optional buffering high-frequency data in response to the identification of an event.

Real time or near-real time analysis of the event to identify key parameters of the event.

Transmitting key parameters of an event over lower frequency, highly efficient wireless communications.

Reconstructing the event at the third party device utilizing transmitted key parameters to allow for data rich content.

As an example, low frequency response accelerometers can be monitored by microchip 42 in a low power mode where no transmission or high data rate sampling is happening. However, in response to a predetermined set of events captured by the accelerometer the system can identify that the bat is in motion and that the player is about to make contact with the ball. Furthermore, the accelerometers can be used to identify if the player is merely tapping the bat on the ground, in which case data capturing will not be initiated, or swinging it freely, in which case data capture is enabled, as will be known to those skilled in the art. Microchip 42 will wake up and start to take and capture high frequency data from sensors 113 for a pre-determined period. Code 43 will manipulate and analyze the signals and determine information to be transmitted via wireless communication 44.

Alternatively, a comparator, a device well known to those skilled in the art, can monitor the output from sensors 113 over conductive traces 111. Comparators are ultra-low power devices that identify when the differential analog output between two traces is over a pre-determined limit. For instance, off-the shelf comparators such as the MAX9027 can monitor two signals at 70 kHz while consuming 1 μA of power. Comparators that operate at higher frequencies are available, but they consume more power. Once the comparators identify this event, it sends a digital signal to microchip 42 to initiate the collection of data. The duration of the data collection event is determined by code 43.

The events that can be captured by microchip 42 are maximum vibration amplitude, arrival time of vibration signal at specific sensor, frequency of vibration, duration of vibration, damping coefficient of vibration and others as known to those skilled in the art. This information can then be translated into a number of useful bits of information that can be transmitted to third party device 46. The following, not exhaustive list of parameters can be determined and calculated via this process: the power of impact of a ball on bat; whether or not there was impact between equipment and ball or other equipment; the location of impact between equipment; the type of equipment being impacted; the speed of the equipment at impact; the position of the equipment versus time; the flexing of equipment versus time etc.

The events described above is determined and accessed via code 43 running on microchip 42. Microchip 42 also determines the key parameters of these events to share via wireless communication 44. Thus, the entire event does not need to be transmitted between communication devices 44 and 45, instead an abbreviated, information rich, low power transmission will indicate the type of event, the timing of the event and other useful parameters such as power and location. Instead of thousands and thousands of bits of data being transmitted, only essential data is transferred. This, in turn, will not only speed up communications between electronics 123 and third party device 46 but it will also conserve energy of the power source of electronics 123, thereby extending useful life of the entire device.

Figure 4:
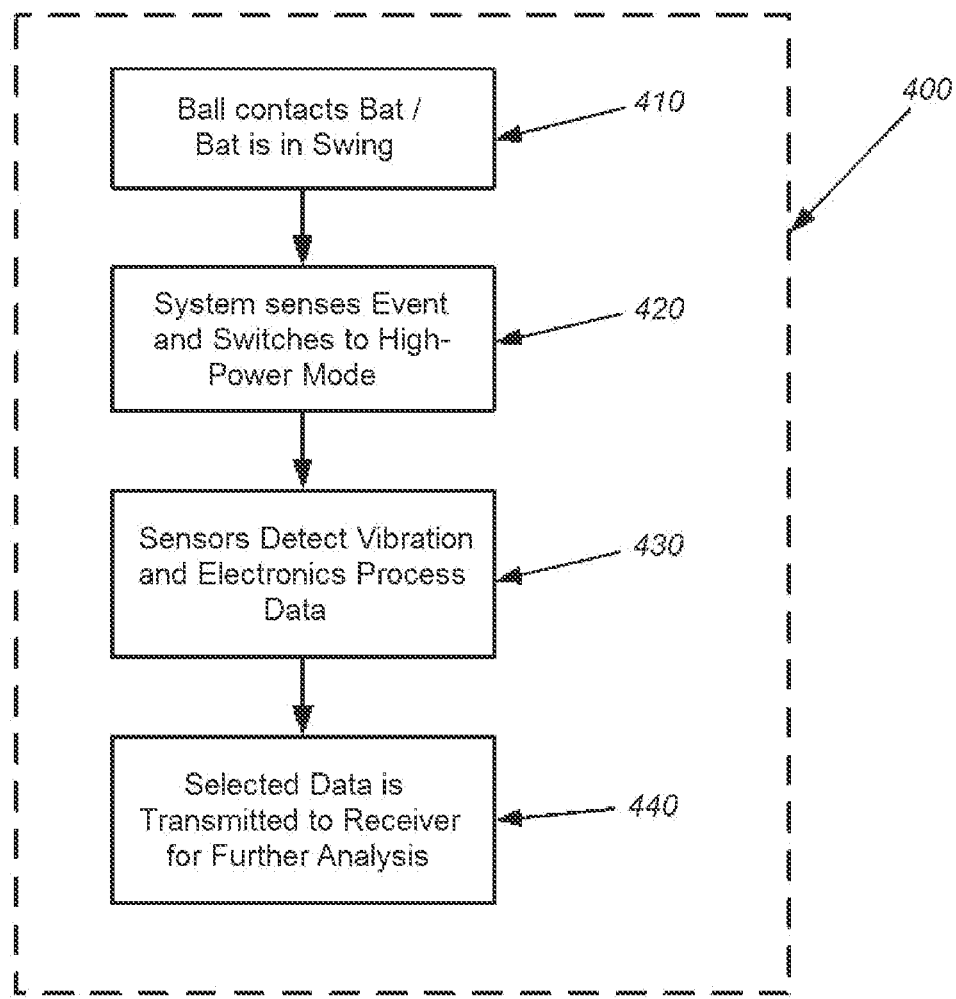
FIG. 4 is an example of basic process for operating the sensing system and transmitting data according to an illustrative embodiment.

Briefly, FIG. 4 shows a basic process 400 for operating the sensor arrangement and associated electronic component(s). First, the sensor arrangement senses motion and/or contact between the equipment (e.g. bat) and another object (e.g. ball) in step 410. This is translated into an event that triggers a switch from a low-power mode to a high-power mode in step 420. The vibrations that are propagated through the bat are then detected and processed by the sensor arrangement and associated electronic components in step 430. These are converted into data that are selectively transmitted to a receiver for further analysis in step 440.

Figure 5A:
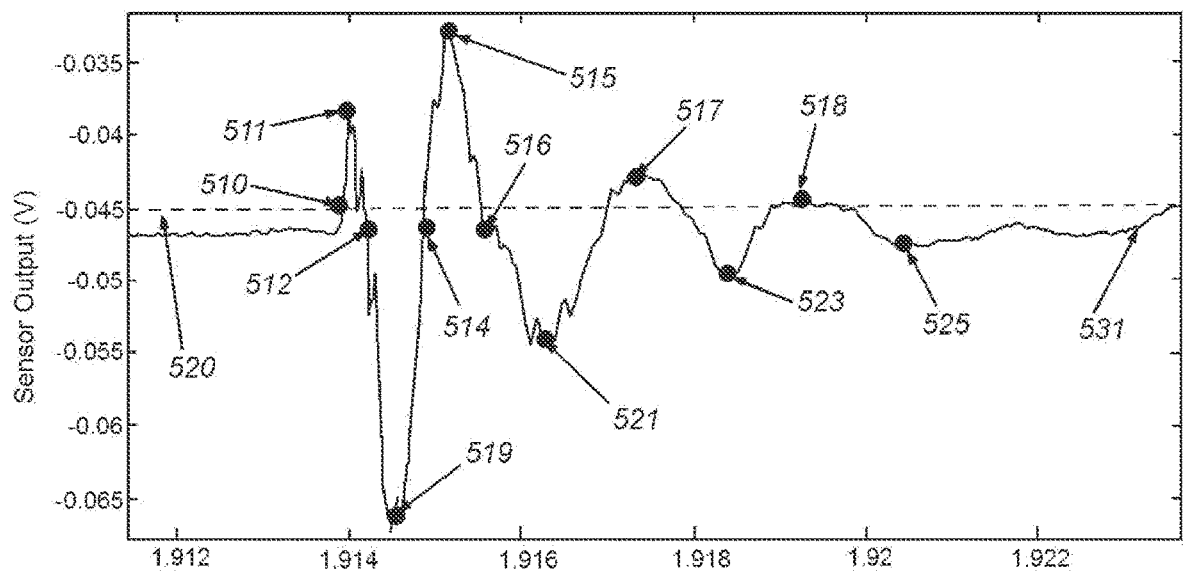
FIGS. 5A and 5B depict an example of an impact trace and how critical information and parameters are collected, analyzed and communicated.
Figure 5B:
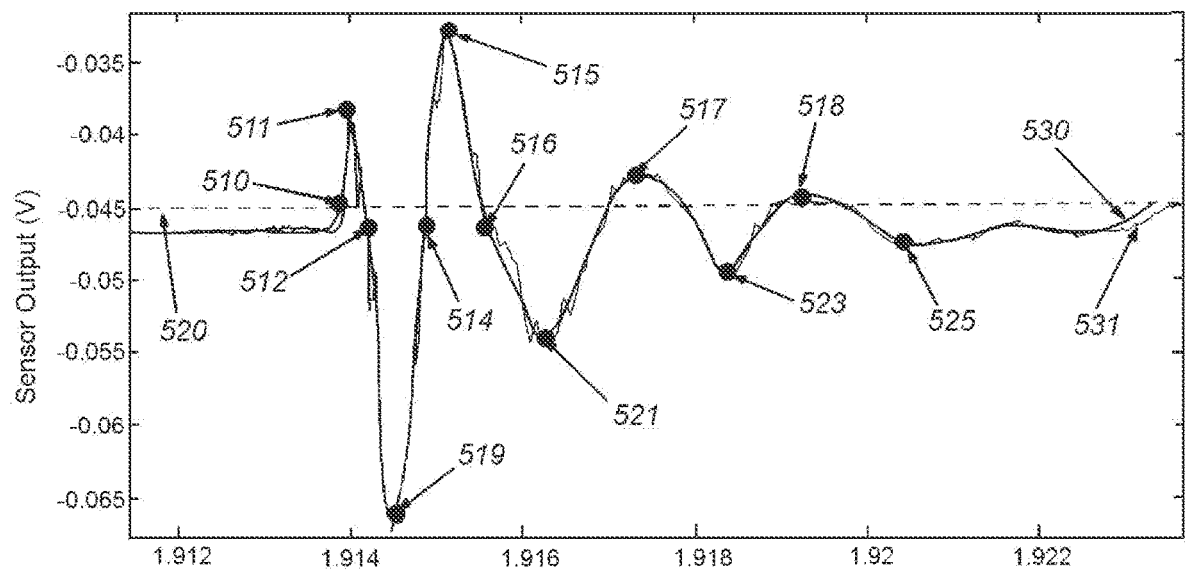

To illustrate the flexibility and usefulness of the above approach, refer to the vibration signal of FIGS. 5A and 5B. Trace 531 in FIG. 5A was taken at a sample rate of 60 kHz and thus contains more than 650 data points for the 1.1 ms duration of the event. A threshold value 520 is set in the software to wake the recording system up when signal 531 passes through it. The system can also be set to wake up in response to a threshold being crossed by additional sensors 40 in FIG. 3 like an accelerometer. High speed data collection starts to record the data from sensors 113 at 60 kHz including a small (100 point for example) buffer to ensure the beginning of the trace is captured. After a set time, the trace stops recording and signal 531 is stored in memory. Simple analytical routines can pick the point 510 where the trace passes though threshold 520, reaches its maximum 514 and minimum 513, where it passes through the average offset 512, 514 and 516 as well as its first maximum or minimum 511 and additional local maxima 517 and 518 and minima 519, 521, 523 and 525. Then, using simple polynomial curve fitting, a high order polynomial curve can be fitted though the identified points. Since these vibration traces tend to have similar shapes and curves, one can re-construct a pseudo curve 530 (FIG. 5B) by knowing only the order of the polynomial and the time and value stamps of each of the selected points. Therefore, microchip 42 in FIG. 3, running at a low data rate and conserving electrical energy, can wake up, record the data of concern, run analytics and pick areas of interest in the data. It needs a short burst of power to complete the entire exercise. Furthermore, by transmitting only 12 data points instead of more than 650, wireless communication device 44 also restricts power usage by utilizing less than 2% of the time that the transmitter has to be on. However, third party device 46, with only 12 data points and the knowledge of the order of the polynomial, can create pseudo curve 530 that contains almost all the information of signal 531. This then enables the third party device to perform further analytics and analyses on pseudo curve 530 and compare it to other corves and events as required. Anyone skilled in the art will appreciate the simplicity of this strategy and how this method saves electrical power versus continuous high frequency monitoring and transmitting and how it removes the need for large scale data storage.

As an example of the utility of the above approach. Pseudo curves 530 can be transmitted and reconstructed in short order from three or more sensors 113 on equipment 101. By comparing data points (510, 511, 512, 514, 515, 516, 517, 518, 519, 521, 523 and 523 and pseudo curves 530 of the different sensors 113, triangulation can be utilized to determine the location of impact that introduced the vibrations.

As a further example, the frequency of pseudo curve 530 can be determined by a simple FFT as know by those skilled in the art. This in turn can provide information on the type of impact, the stiffness of the equipment that was impacted and if there was any impact at all. The utility of this information is best illustrated when applied to the game of cricket where impacting the ball versus other pieces of equipment like a boot or pad will induce vibrations of distinctively different amplitude, vibration and damping. Furthermore, aerodynamic forces can introduce vibrations in the bat when the ball gets sufficiently close to the bat without touching it. These vibrations manifest themselves as sound in the atmosphere and can be misinterpreted as the ball touching the bat, leading to the erroneous dismissal of a batman if the ball is caught. The system described here will be able to identify the frequency of this aerodynamic induced vibration and will be able to distinguish it from when the ball actually makes contact with the bat.

The above example also serves as an illustration of why high>2 kHz sensing devices are required to identify and capture vibration trace 531 in FIG. 5A. Since the entire duration of the event in trace 531 is on the order of 1 ms, it should be clear to those skilled in the art that a system sampling at 1 kHz will capture at most a single data point of the entire trace. If this single point happens to be points 512, 514, 516 or 525, the system might mistake the event for ambient noise and will not register the event. For a device that is utilized in umpiring decision making in the game of cricket, for instance, this will be a fatal flaw in the system and one that will render the device useless. As will be appreciated by those skilled in the art, a sampling of 2 kHz will increase the chances of identifying the event by taking maximum two samples during the 1 ms duration of the event. However, if the two traces are below threshold event 520, the system might still mistake the event as noise. Therefore, high-frequency data capture of 12 kHz or higher is ideal for the identification of the event.

It should be clear that the system and method of the illustrative embodiment provides an effective mechanism for providing vibration measurements in connection with handheld and similar sporting equipment that is unobtrusive and doers not detract from the function or aesthetics of the equipment. Moreover, the sensor serves as a generally desired indicia normally provided on such equipment. The data generated by the sensor is useful and of sufficient accuracy to provide a wide range of useful analytic data for both real time monitoring or performance and post-usage analysis.

The foregoing has been a detailed description of illustrative embodiments of the method and apparatus. Various modifications and additions can be made without departing from the spirit and scope of this method and apparatus. Features of each of the various embodiments described above may be combined with features of other described embodiments as appropriate in order to provide a multiplicity of feature combinations in associated new embodiments. Furthermore, while the foregoing describes a number of separate embodiments of the apparatus and method, what has been described herein is merely illustrative of the application of the principles. For example, locations to which the sensor can be applied are highly variable and multiple sensors can be applied at various locations on the equipment and can work in coordination or discretely based upon controlling circuitry that selects and/or combines signals in accordance with skill in the art. Likewise, the material of the equipment can be highly variable—e.g. wood, polymer, composite, metal or a combination thereof can be employed.

Furthermore, while the foregoing describes a number of separate embodiments of the apparatus and method, what has been described herein is merely illustrative of the application of the principles. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this disclosure.

The invention claimed is:

1. A system for reporting events of interest in a structure comprising:
    an apparatus configured to be securely adhered to a surface of the structure;
        a flexible portion of the apparatus which conforms to a shape of the surface of the structure;
        the flexible portion containing a high frequency soft polymer sensor to measure low and high frequency vibration data for a period of time;
        the flexible portion further containing conductive traces to connect the sensor to electronics, the electronics to capture and buffer a signal output by the sensor;
        the apparatus to transmit the captured signal to a computational element;
        the computational element to analyze the captured signal over time to identify the events of interest, wherein the low and high frequency vibration data is used to distinguish the events of interest from aerodynamic vibrations.

2. The system of claim 1 where the computational element further derives one or more parameters from the captured signal, and the computational element to further selectively communicate a subset of the events of interest.

3. The system of claim 2 where selective communication is used to save power.

4. The system of claim 2, wherein the electronics further comprise:
    storage memory to store one or more of the captured signals, the events of interest and the parameters.

5. The system of claim 4 where the communication element transmits contents of the storage memory.

6. The system of claim 1 further comprising:
    a second apparatus including a second sensor to capture a second signal; and
    the computational element to synchronize the captured signal from the sensor and the second sensor, prior to analyzing the captured signal.

7. The system of claim 6, further comprising:
    an optical device to provide a synchronization signal; and
    the computational element using the synchronization signal to synchronize the captured signals from the sensor and the second sensor.

8. The system of claim 6, further comprising:
    a wireless device to provide a synchronization signal; and the computational element using the synchronization signal to synchronize the captured signals from the sensor and the second sensor.

9. The system of claim 1 wherein:
the electronics comprise additional sensors; and
the signal from the additional sensors is transmitted.

10. The system of claim 1 further comprising:
the computational element capable of reproducing the events of interest from the transmitted captured signal.

11. The system of claim 1 which includes a power source.

12. The system of claim 11, wherein the power source is re-charged via one or more of: wireless inductive charging, solar charging, vibration energy harvesting, or wired connection.

13. The system of claim 1 where the flexible portion comprises the sensors co-encapsulated with the electronics.

14. The system of claim 1 wherein a communicated output is synchronized with signals from an additional sensing apparatus.

15. A system for reporting events of interest in a structure comprising:
an apparatus configured to be securely adhered to a surface of the structure;
a flexible portion of the apparatus which conforms to a shape of the surface of the structure;
the flexible portion containing a high frequency soft polymer sensor to measure low and high frequency vibration data for a period of time;
the flexible portion further containing conductive traces to connect the sensor to electronics, the electronics to capture and buffer a signal output by the sensor;
the apparatus to transmit the captured signal to a computational element;
the computational element to analyze the captured signal over time to identify the events of interest;
wherein a communicated output is synchronized with signals from an additional sensing apparatus, and wherein the additional sensing apparatus comprises an optical sensor.

16. The system of claim 15, wherein the low and high frequency vibration data is used to distinguish the events of interest from aerodynamic vibrations.

17. A method of reporting events of interest in a structure comprising:
securely adhering an arrangement of a plurality of vibration sensing apparatuses to the structure, each of the vibration sensing apparatuses including a high frequency polymer sensor;
capturing low and high frequency vibration data for a period of time using the plurality of vibration sensing apparatuses;
periodically sending the low and high frequency vibration data to a receiving element;
synchronizing the low and high frequency vibration data from the plurality of vibration sensing apparatuses using a signal; and
sending the synchronized data to a computational element for analysis to identify the events of interest;
wherein the low and high frequency vibration data is used to distinguish the events of interest from aerodynamic vibrations.

18. A method of reporting events of interest in a structure comprising:
securely adhering an arrangement of a plurality of vibration sensing apparatuses to the structure, each of the vibration sensing apparatuses including a high frequency polymer sensor;
capturing low and high frequency vibration data for a period of time using the plurality of vibration sensing apparatuses;
periodically sending the low and high frequency vibration data to a receiving element;
synchronizing the low and high frequency vibration data from the plurality of vibration sensing apparatuses using a signal; and
sending the synchronized data to a computational element for analysis to identify the events of interest;
wherein the signal for the synchronizing is obtained from an optical device.

19. The method of claim 18, wherein the optical device comprises a camera.

20. The method of claim 17, wherein the signal for the synchronizing is obtained from a wireless device.

\* \* \* \* \*